(12) United States Patent
Lu et al.

(10) Patent No.: US 6,284,021 B1
(45) Date of Patent: Sep. 4, 2001

(54) COMPOSITE ADSORBENT BEADS FOR ADSORPTION PROCESS

(75) Inventors: Yaping Lu, Scotch Plains; Shain-Jer Doong, Millington; Martin Bülow, Basking Ridge; Dongmin Shen, Berkeley Heights; Divyanshu R. Acharya, Bridgewater; Mark J. Andrecovich, Somerville; Frank R. Fitch, Bedminster; Adeola Florence Ojo, Scotch Plains, all of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/388,883

(22) Filed: Sep. 2, 1999

(51) Int. Cl.⁷ .................................................. B01D 53/047
(52) U.S. Cl. ................................... 95/96; 95/102; 95/114
(58) Field of Search .............................. 95/95–106, 114, 95/115, 900–903; 55/524

(56) References Cited

U.S. PATENT DOCUMENTS

| | | | |
|---|---|---|---|
| 4,499,208 | * | 2/1985 | Fuderer ................................ 95/96 X |
| 4,762,537 | * | 8/1988 | Fleming et al. ................... 95/902 X |
| 4,793,980 | * | 12/1988 | Torobin .............................. 95/95 X |
| 4,859,217 | | 8/1989 | Chao ........................................ 55/68 |
| 4,891,174 | | 1/1990 | Seki et al. .............................. 264/44 |
| 4,904,291 | | 2/1990 | Siebers et al. ........................ 65/18.1 |
| 5,179,979 | | 1/1993 | Zollinger ............................. 139/449 |
| 5,258,060 | | 11/1993 | Gaffney et al. ....................... 95/101 |
| 5,266,102 | | 11/1993 | Gaffney et al. ....................... 95/103 |
| 5,292,360 | * | 3/1994 | Pacaud et al. ...................... 95/902 X |
| 5,316,993 | | 5/1994 | Sextl et al. ............................. 502/68 |
| 5,401,706 | * | 3/1995 | Fischer ............................... 95/902 X |
| 5,411,577 | * | 5/1995 | Moreau et al. ..................... 95/903 X |
| 5,417,742 | * | 5/1995 | Tamhankar et al. ............... 95/902 X |
| 5,464,467 | | 11/1995 | Fitch et al. ............................... 95/98 |
| 5,616,170 | * | 4/1997 | Ojo et al. ............................ 95/902 X |
| 5,779,767 | * | 7/1998 | Golden et al. .......................... 95/96 |
| 5,882,625 | | 3/1999 | Mac Dougall et al. ............. 423/700 |
| 5,917,136 | * | 6/1999 | Gaffney et al. ...................... 95/97 X |

FOREIGN PATENT DOCUMENTS

| | | |
|---|---|---|
| 3743 663 A1 | 7/1989 | (DE) . |
| 3826 220 A1 | 2/1990 | (DE) . |
| 0 308 873 A2 | 3/1989 | (EP) . |
| 0 309 048 A1 | 3/1989 | (EP) . |
| PCT/JP85/ 00499 | 11/1985 | (WO) . |

* cited by examiner

*Primary Examiner*—Robert H. Spitzer
(74) *Attorney, Agent, or Firm*—Philip H. Von Neida; Salvatore P. Pace

(57) ABSTRACT

A gas separation process comprising feeding a gaseous mixture comprising at least two components having different adsorption characteristics into an adsorption vessel containing at least one adsorbent material capable of preferentially adsorbing at least one of the gaseous components in the gaseous mixture and subjecting the gaseous mixture to non-cryogenic conditions which enable the preferentially adsorbable gaseous component in the gaseous mixture to adsorb onto the adsorbent material and separate from the non-adsorbed component in the gaseous mixture which pass through the adsorbent vessel wherein at least one adsorbent material in the adsorbent vessel comprises a composite particle having an inner core comprising a non-porous, non-adsorbent material and at least one outer layer comprising the adsorbent material. In another embodiment of the process of the present invention a hollow particulate adsorbent material is utilized.

27 Claims, 1 Drawing Sheet

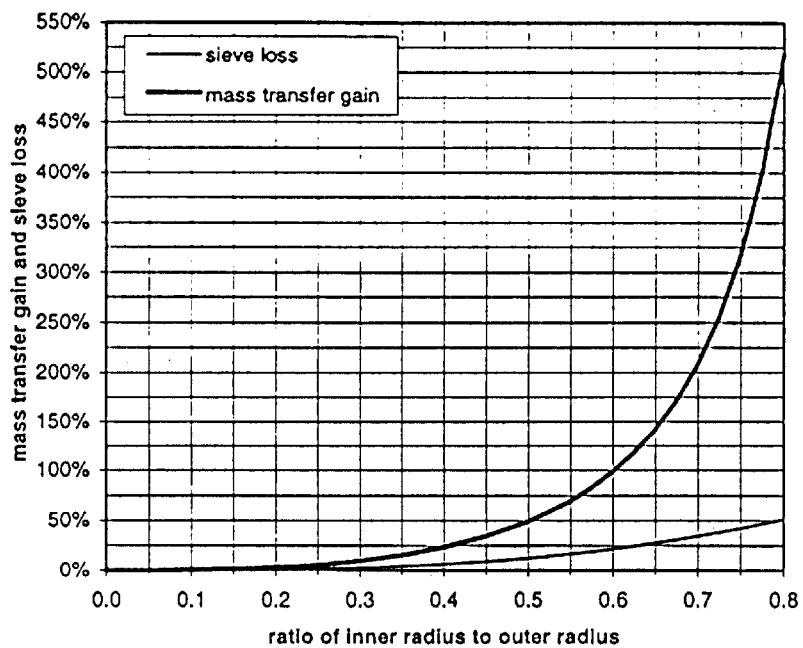
Figure 1. Mass transfer gain and sieve loss as function of inner to outer radius ratio for a composite adsorbent bead
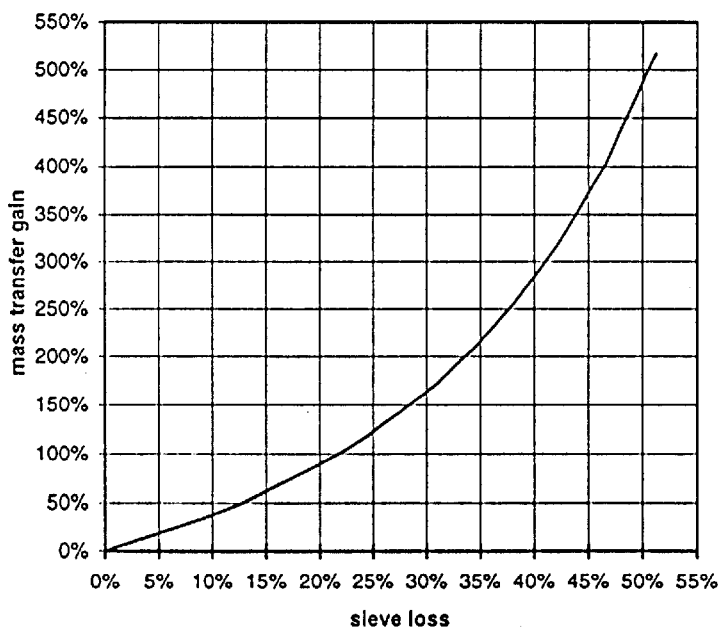
Figure 2. Mass transfer gain vs sieve loss for a composite adsorbent bead

COMPOSITE ADSORBENT BEADS FOR ADSORPTION PROCESS

BACKGROUND OF THE INVENTION

The invention relates to a non-cryogenic separation process for separating components in a gaseous mixture. More particularly, it relates to improved pressure swing adsorption (PSA), vacuum swing adsorption (VSA) or temperature swing adsorption (TSA) process utilizing composite adsorbent particles.

Cryogenic air separation plants utilize ultra-low temperatures to separate oxygen and nitrogen from air. Such plants typically utilize low amounts of power, but have high capital costs associated therewith. Because of such high capital costs, cryogenic air separation plants are competitive only for high flow capacity and higher purity operations. For lower capacity operations, where cryogenic air separation plants may not be economically feasible, non-cryogenic processes are particularly suitable for a wide variety of important commercial applications. For example, air which has been substantially enriched in oxygen is used in various industries, such as chemical processing, steel mills, paper mills, and in lead and gas production operations. Nitrogen is also used in numerous chemical processing, refinery, metal production and other industrial application.

In the typical non-cryogenic adsorption process, a feed gas mixture, such as air, containing a more readily adsorbable component and a less readily adsorbable component, e.g. the nitrogen and oxygen components of air, is passed to the feed end of an adsorbent bed capable of selectively adsorbing the more readily adsorbable component at a higher adsorption pressure. The less readily adsorbable component passes through the bed and is recovered from the discharge end of the bed. Thereafter, the bed is depressurized (PSA), heated to higher temperature (TSA) or evacuated (VSA) to enable desorption of the more readily adsorbable component from the adsorbent and its removal from the feed end of the bed prior to the introduction of additional quantities of the feed gas mixture for treatment in a cyclic adsorption-desorption operation. Such processing is commonly carried out in multi-bed systems, with each bed employing the PSA, VSA or TSA processing sequence on a cyclic basis interrelated to carrying out of such processing sequence in the other beds of the adsorption system.

In PSA systems for the recovery of higher purity oxygen product as the less readily adsorbable component of air, each adsorbent bed will commonly contain an adsorbent material capable of selectively adsorbing nitrogen as the more readily adsorbable component, with the selectively adsorbed nitrogen being subsequently desorbed and recovered from the bed upon reduction of the pressure of the bed from the higher adsorption pressure level to a lower desorption pressure level. PSA systems for the recovery of nitrogen product have likewise been based on the use of adsorbents that selectively adsorb oxygen from air as the more readily adsorbable component thereof.

Early air separation systems, in particular, PSA systems, utilized two or more beds, with well-known molecular sieves, e.g. 13X zeolite molecular sieve material, being used as the adsorbent therein. Such zeolitic molecular sieve material, and other such materials, e.g. 5A material, capable of selectively adsorbing nitrogen from air, are equilibrium type adsorbents. Thus, an adsorption front of the selectively adsorbed nitrogen is formed at the feed end of the bed of such material, and advances toward the discharge or oxygen product end as a result of the equilibrium conditions established in the bed of zeolite molecular sieve material between the more readily adsorbable nitrogen and the less readily adsorbable oxygen components of feed air.

While conventional zeolite molecular sieves can be used effectively in PSA operations, specially modified materials can also be used for the desired selective adsorption of nitrogen from feed air, and the recovery of oxygen or nitrogen as the desired product gas. Thus, lithium cation exchanged forms of zeolite X have been developed for use in PSA and VSA systems. Such lithium exchanged zeolites, e.g. LiX adsorbent are found to exhibit highly desirable capacities and selectivities toward the adsorption of nitrogen from air or other streams containing less polar or less polarizable molecular species such as oxygen.

U.S. Pat. No. 4,859,217 discloses that very good adsorptive separation of nitrogen from oxygen can be obtained at temperatures of 15° C. to 70° C. using a type X zeolite which has more than 88% of its ions present as lithium ions, particularly when a zeolite having a silicon to aluminum atomic ratio of 1 to 1.25 is used. Lithium, divalent ion forms of zeolite type X (for example those described in U.S. Pat. No. 5,179,979) and lithium, trivalent ion exchanged forms of zeolite type X (as described in U.S. Pat. No. 5,464,467) also have excellent capacities and selectivities for nitrogen adsorption from oxygen, and have other advantages over Li-X, including better thermal stabilities.

While economical non-cryogenic gas separation processes have been developed, a constant challenge remains to improve the efficiency of these processes. Most research directed to meeting this challenge has been focused on improving the capacity and/or selectivity of the adsorbents. The present invention is directed to a unique approach to meeting this challenge without necessarily improving the capacity and selectivity of the adsorbent being used.

SUMMARY OF THE INVENTION

It is the primary object of the present invention to provide a novel non-cryogenic gas separation process.

It is a further object of the present invention to provide a novel VSA process for gas separation.

It is another object of the present invention to provide a novel PSA process for gas separation.

It is a still further object of the present invention to provide a novel TSA process for gas separation.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the present invention as embodied and described herein, the gas separation process of the present invention comprises feeding a gaseous mixture comprising at least two components having different adsorption characteristics into an adsorption vessel containing at least one adsorbent material capable of preferentially adsorbing at least one of the gaseous components in the gaseous mixture and subjecting the gaseous mixture to conditions which enable the preferentially adsorbable gaseous component in the gaseous mixture to adsorb onto the adsorbent material and separate from the non-adsorbed component in the gaseous mixture which pass through the adsorbent vessel wherein at least one adsorbent material in the adsorbent vessel comprises a composite particle having an inner core comprising a non-porous, non-adsorbent material and at least one outer layer comprising the adsorbent material. The non-porous material may be any material with essentially no pores or with pores the apertures of which do not allow gas molecules to be adsorbed under process conditions.

In a preferred embodiment of the present invention the gas separation process is performed by pressure swing adsorption (PSA).

In a further preferred embodiment of the present invention, the gas separation process is performed by vacuum swing adsorption (VSA).

In a still further preferred embodiment of the present invention, the gas separation process is performed by temperature swing adsorption (TSA).

In still another preferred embodiment of the present invention, the gas separation or purification process is performed by a combination of PSA, TSA, and VSA.

In another preferred embodiment of the present invention, the outer layer of porous adsorbent material is selected from the group consisting of activated alumina, zeolites, mesopore-structured materials and mixtures of these.

In still another preferred embodiment of the present invention, the inner core non-porous material is selected from the group consisting of metals, metal oxides, mixed oxides, dense ceramic oxides such as cordierite, perovskite, etc., sintered clays such as kaolin, attapulgite, etc, silicas, aluminas, silica-alumina, silica-magnesia, silica-zirconia, silica-thoria, silica-beryllia, and silica-titania, as well as ternary compositions, such as silica-alumina-thoria, silica-alumina-zirconia, and mixtures of these.

In a still further preferred embodiment of the present invention, the inner core non-porous material is selected to have a higher heat conductivity than the adsorbent material.

In another preferred embodiment of the present invention, the inner core non-porous material has a density greater than the density of the adsorbent material.

In still another preferred embodiment of the present invention, the composite particles are in the shape of beads having a radius between 0.5 mm to 5 mm., preferably 1 to 4 mm., especially preferred being 1.5 to 2.5 mm.

In another aspect of the present invention as embodied and described herein, the gas separation process comprises feeding a gaseous mixture comprising at least two components having different adsorption characteristics into an adsorption vessel containing at least one adsorbent material capable of preferentially adsorbing at least one of the gaseous components in the gaseous mixture and subjecting the gaseous mixture to conditions which enable the preferentially adsorbable gaseous component in the gaseous mixture to adsorb onto the adsorbent material and separate from the non-adsorbed gaseous component in the gaseous mixture which passes through the adsorption vessel wherein at least one adsorbent material comprises a hollow adsorbent particulate material.

In a preferred embodiment of this aspect of the present invention, the adsorbent particulate material comprises a hollow particle of adsorbent material, which may or may not have an impervious barrier to the transport of gas molecules at its interior surface.

In a further preferred embodiment of this aspect of the present invention, the adsorbent particulate material comprises hollow spheres.

DESCRIPTION OF THE DRAWING

FIG. 1 is a graphical representation of the mass transfer gain and adsorbent volume loss of a composite adsorbent of the present invention as a function of inner to outer radius ratio.

FIG. 2 is a graphical representation of the mass transfer gain vs. the volume fraction of non-selective material in a composite adsorbent of the present invention.

A description of the present invention will now be set forth in detail.

DETAILED DESCRIPTION OF THE INVENTION

Most of the industrial adsorption separation and purification processes are based on physical adsorption. Physical adsorption is an extremely rapid process and the overall adsorption/desorption rate is always controlled by mass or heat transfer resistances rather than by the intrinsic sorption rate at the active surface. Generally, there are four types of resistances to the mass transfer: (a) micropore diffusional resistance within the microparticles; (b) macropore diffusional resistance through the macropore of the gross particle; (c) mass transfer resistance at the external surface of the microparticle (so-called surface barrier or "skin"resistance); and (d) mass transfer at the external surface of the gross particle (for example film resistance).

If adsorption/desorption processes are controlled by diffusional transport through the macropores of the gross particle, the uptake/desorption rate is inversely proportional to the square of the radius of the adsorbent beads (gross particle). Thus, the mass transfer can be enhanced by reducing the gross particle size. However, using smaller adsorbent beads in the adsorption separation processes also leads to higher pressure drop through the adsorbent vessels and higher power consumption.

In this invention, composite adsorbent beads are used to improve the mass transfer without reducing the overall particle size. The first embodiment of the present invention comprises using composite adsorbent beads having an inner core (preferably an inert and dense material) with an outer layer of a porous adsorbent material. Although the useable volume of the porous material is reduced, the gain in the mass transfer rate is much greater than the loss in porous adsorbent material.

Based on the analysis of the diffusion in a composite spherical bead with inert inner core and a conventional spherical bead, the gain in mass transfer rate and the loss in adsorbent volume as a result of the use of the composite bead instead of the conventional one are shown in FIG. 1, as functions of the ratio of the inner radius to the outer radius. As can be seen from the plot, the mass transfer gain increases much faster than the sieve volume loss. FIG. 2 is a plot of mass transfer gain versus sieve loss. As can be seen from FIG. 2, at a sieve volume loss of 40%, the mass transfer is almost 300% higher than in a conventional sieve bead.

While it appears advantageous to employ smaller particles in adsorption processes to make use of their better mass transfer characteristics, in practice the use of smaller particles makes adsorber design more difficult. The key issues in the case are the onset of adsorbent particle movement or fluidization at lower gas velocities and the increased bed pressure drop caused by small particles.

Composite beads provide an attractive alternative to the conventional particulate adsorbent beds as they retain the performance characteristics of small particles but help avoid the pressure drop penalty usually associated with small particles. Low pressure drop translates into greater power savings. From a process design point of view, the increased fluidization limit allows the use of smaller vessels and higher gas throughputs, both resulting in increased productivity and reduced capital cost.

The second aspect of the present invention comprises utilizing hollow particulate adsorbent material. While the hollow adsorbent material provides a loss in adsorbent volume, the macropore diffusion resistance through the micropores of the gross particles is greatly enhanced which more than offsets any loss in performance due to decrease in adsorbent volume.

It is envisioned that utilization of the composite adsorbent material of this invention will improve any non-cryogenic gas separation or purification process. That is, the composite adsorbent material may be used in TSA, PSA and VSA processes with equally good results. The conditions utilized in each of these separation processes are well known in the art and do not form a part of this invention.

The adsorption process of the invention can be carried out in a system comprising a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing the strongly adsorbed gas component, while one or more other units are undergoing regeneration to desorb the adsorbed gas component. Operation of the adsorption systems of the invention is preferably cyclical. In the preferred adsorption process, cycles are repeatedly carried out in a manner such that production of the desired product gas is substantially continuous. In preferred embodiments of the invention, the process is carried out in a twin bed system comprising a pair of adsorption vessels arranged in parallel and operated 180° of phase, with each adsorption vessel of the system being packed with the adsorbent composition of the invention.

The system in which the adsorption process of the invention is carried out may comprise only a layer of the adsorbent of the invention or it may comprise a series of layers contained in a single vessel or in two or more vessels arranged in series. For example, the system may comprise a first layer or bed of adsorbent which is selective for water vapor and/or carbon dioxide and a second layer or bed comprising the adsorbent compositions of the invention. Furthermore, a combination of alternate layers of different adsorbents which are selective for the component to be adsorbed, or mixtures of different adsorbents that are selective for the component to be adsorbed may be employed. The construction and arrangement of the adsorbent material of the invention is not critical to the invention. As used in this description, adsorption zones include monolayers and polylayers in conventional arrangements, and also includes laminates and monoliths in any type of block and/or wheel arrangement.

The adsorption process of the invention is preferably a cyclic adsorption process, such as pressure swing adsorption (PSA), vacuum swing adsorption (VSA), temperature swing adsorption (TSA) or combinations of these. Regeneration of the adsorbents used in the invention may also be effected by purging the beds with or without pressure and/or temperature change during the regeneration step, relative to the adsorption step of the process.

The temperature at which the adsorption step is carried out may vary over a wide range, for example from a minimum temperature of about −50° C. to a maximum of about 200° C. It is generally preferred, however that the adsorption temperature be in the range of about 0 to about 80° C., and it is most preferred that it be in the range of about 5 to about 40° C.

The pressure at which the adsorption step can be carried out varies over a wide range. For pressure swing adsorption cycles the adsorption step is generally carried out at a pressure in the range of about 0.8 to about 50 bara (bar absolute), and is preferably carried out at a pressure in the range of about 1 to 20 bara, and for temperature swing adsorption cycles the adsorption step is usually carried out at or above atmospheric pressure.

When the adsorption process is PSA the regeneration step is generally carried out at temperatures in the neighborhood of the temperature at which the adsorption step is carried out and at an absolute pressure lower than the adsorption pressure. The pressure during the regeneration step of PSA cycles is usually in the range of about 0.1 to about 5 bara, and it is preferably in the range of about 0.2 to about 2 bara during regeneration. The regeneration phase may be a multi-step procedure which includes a depressurization step during which the vessels containing the adsorbent are vented until they attain the desired lower pressure, and an evacuation step, during which the pressure in the vessels is reduced to subatmospheric pressure by means of a vacuum inducing device, such as a vacuum pump.

When the adsorption process is TSA, bed regeneration is carried out at a temperature higher than the adsorption temperature, and is usually carried out at temperatures in the range of about 50 to about 300° C., and is preferably carried out at temperatures in the range of about 100 to 250° C. When a combination of PSA and TSA is used the temperature and pressure during the bed regeneration step are higher and lower, respectively, than they are during the adsorption step.

In some cases, in addition to the depressurization steps (PSA cycles) or the adsorbent heating steps (TSA cycles), it may be desirable to purge the bed with weakly adsorbed gas, such as the nonadsorbed product gas stream exiting the adsorption vessels. In this case the vessels may be purged (preferably countercurrently) with the less readily adsorbed gas. The purge step is usually initiated towards the end of the depressurization step, or subsequent thereto. The purge gas can be introduced into the adsorption vessels from a product storage facility, for example, when the adsorption system comprises a single adsorption vessel; or from another adsorption vessel that is in the adsorption phase of an adsorption cycle, for example, when the adsorption system comprises multiple adsorption vessels arranged in parallel and operated out of phase.

The cycle used in the invention may include steps other than the basic steps described above. For example, when PSA processes are practiced, the cycle may include one or more bed equalization steps, a nonadsorbed product backfill step and countercurrent nonadsorbed product purge steps. The sequential order and duration of the various steps are not critical, and these may be varied, as desired.

It will be appreciated that it is within the scope of the present invention to utilize conventional equipment to monitor and automatically regulate the flow of gases within the system so that it can be fully automated to run continuously in an efficient manner.

The process of the present invention can be practiced with known adsorbent materials such as zeolites, mesopore-structured materials, carbon molecular sieve, other inorganic porous materials such as metal oxides and mixtures of these which have been manufactured into the composites as described below.

In a preferred embodiment, the zeolite is of the structural types BEA, CHA, EMT, ERI, FAU, FER, GIS, HEU, LTA, LTL, MAZ, MEI, MEL, MFI, MOR, MTW, OFF, TSC, ZSM-2, ZSM-18, ZSM-48 or mixtures of these. Specific zeolites of members of these classes are BEA: beta, tschernichite, etc.; CHA: chabazite, Linde D, Linde R, phi, etc.; EMT: ZXM-3, ZSM-20, hexagonal faujasite, etc.; ERI: erionite, LZ-220, etc.; FAU: faujasite, type X zeolite, type Y zeolite, etc.; FER: ZSM-35, Fu-9, etc.; GIS; synthetic zeolite P, TMA-gismondine, etc.; HEU: clinoptilolite, heulandite, LZ-219, etc.; LTA: type A zeolite, alpha, ZK-4, etc.; LTL: Linde type L, LZ-212, perlialite, etc.; MAZ: ZSM-4, omega, etc.; MEL: silicalite-II, TS-2, etc.; MFI: ZSM-5, silicalite-I, etc.; MOR: large port mordenite, LZ-211, zeolon, etc.; MTW: Nu-13, theta-3, etc.; and OFF: offretite, Linde type T, LZ-217, etc. Specific examples of zeolites that are preferred for use in producing the adsorbent compositions of the invention are natural zeolites, such as mordenite, erionite, clinoptilolite and chabazite, and synthetic zeolites, such as type X zeolite, type A zeolite, type Y zeolite and ZSM-5. The most preferred zeolite is type X zeolite, particularly low silica X (LSX). Preferably, the LSX zeolite has a Si/Al atomic ratio in the range of about 0.9 to about 1.25. Most preferably, it has a Si/Al atomic ratio in the range of about 0.9 to about 1.1.

In another embodiment of the invention, the zeolite is type Y zeolite having a Si/Al atomic ratio of at least about 5. In another embodiment the zeolite is of the MOR type and it has a Si/Al atomic ratio in the range of about 5 to about 10. In another embodiment the zeolite is of the OFF type, and it has a Si/Al atomic ratio in the range of about 2.5 to about 5. In another embodiment the zeolite is of the MFI type and it has a Si/Al atomic ratio of at least about 5. In another embodiment the zeolite is of the CHA type and it has a Si/Al atomic ratio in the range of about 2 to about 6.

The above zeolites may be used in their natural state or in their synthetic form i.e., with the exchangeable cations that they possess in nature or which they have when they are first prepared, or they may be modified by replacing the original cations with other cations. Generally, at least 50% of the exchangeable cations of the zeolite are ions of at least one of groups 1A, 1B, 2A, 2B, 3A, 3B, of the periodic table. Preferably, at least 50% of the exchangeable cations of the zeolite are lithium ions. More preferably, about 50 to about 100% of the exchangeable cations are lithium ions; 0 about 50% of said exchangeable cations are monovalent cations selected from sodium, potassium, rubidium, cesium, silver, copper (I) and mixtures of these, divalent cations selected from calcium, magnesium, barium, strontium, zinc, cadmium, cobalt, iron (II), manganese (II) and mixtures of these, trivalent ions selected from aluminum, scandium, gallium, iron (III), chromium (III), indium, yttrium, single lanthanides, mixtures of two or more lanthanides and mixtures of these, and mixtures of the above divalent and trivalent cations. Still more preferably, the exchangeable cations comprise about 70 to about 100% lithium ions and 0 to about 30% of divalent cations, trivalent ions or mixtures of divalent cations and trivalent cations. The trivalent ions are preferably aluminum, cerium, lanthanum, mixtures of two or more lanthanides in which the total lanthanum, cerium, praseodymium and neodymium ions present in the mixture comprises at least 50% of the total lanthanide ions, and mixtures of these.

As indicated above, preferred zeolites can also have combinations of two or more different cations as their exchangeable cations. Examples of preferred cation combinations include lithium and other monovalent cation-exchanged zeolites, such as mixed lithium/sodium-exchanged zeolites, mixed lithium/potassium-exchanged zeolites and lithium/sodium/potassium-exchanged zeolites; lithium/divalent cation-exchanged zeolites, such as mixed lithium/calcium-exchanged zeolites, mixed lithium/magnesium-exchanged zeolites, mixed lithium/strontium-exchanged zeolites, mixed lithium/calcium/magnesium-exchanged zeolites; mixed lithium/trivalent cation-exchanged zeolites, such as mixed lithium/rare earth cation-exchanged zeolites, for example mixed lithium/lanthanum-exchanged zeolites, etc.; and mixed calcium/monovalent cation-exchanged zeolites, such as mixed calcium/sodium-exchanged zeolites, mixed calcium/lithium-exchanged zeolites, etc. In the above examples, the first named cation of the combination is generally present as the predominant cation.

The most preferred zeolites are those that have lithium and/or calcium as the predominant exchangeable cation(s). Such zeolites include compositions in which about 50 to about 100% of the exchangeable cations of the zeolite are lithium and/or calcium ions; and 0 to about 50% of the exchangeable cations are other cations, for example, monovalent cations selected from sodium, potassium and silver-I and mixtures of these; divalent cations selected from magnesium, barium, strontium, zinc, copper II and mixtures of these; trivalent ions selected from aluminum, scandium, gallium, iron (III), chromium (III), indium, yttrium, single lanthanides, mixtures of two or more lanthanides and mixtures of these; and mixtures of the above divalent and trivalent cations; and mixtures of these monovalent, divalent and trivalent ions.

In most preferred aspect, the exchangeable cations comprise about 70 to about 100% lithium ions, about 0 to about 30% of the above-named monovalent and/or divalent and/or trivalent ions and 0 to about 10% of the residual ions. Preferably, the divalent cations are selected from calcium, magnesium, strontium, zinc, cadmium and mixtures of these, and the trivalent ions are selected from aluminum, cerium, lanthanum, mixtures of two or more lanthanides in which the total lanthanum, cerium, praseodymium and neodymium ions present in the mixture comprises at least 50% of the total lanthanide ions, and mixtures of these.

In a preferred aspect of the present invention, the inner core non-porous material may be selected to have a higher heat conductivity than the adsorbent material. Examples of suitable non-porous materials include but are not limited to metals such as aluminum, copper, and lead as well as corundum, silicon carbide and carbon.

In another preferred embodiment of the present invention, the inner core non-porous material has a density greater than the density of the adsorbent material. Examples of suitable non porous high density materials are metal oxide, mixed oxides, dense ceramic oxides such as cordierite, perovskite, etc., sintered clays such as kaolin, attapulgite, etc, silicas, aluminas, silica-alumina, silica-magnesia, silica-zirconia, silica-thoria, silica-beryllia, and silica-titania, as well as ternary compositions, such as silica-alumina-thoria, silica-alumina-zirconia, and mixtures of these.

The composite and/or hollow particles useful in the practice of the present invention may be fabricated by conventional methods well known to those skilled in the art. For purposes of illustration only, a general description of the procedures for manufacturing these types of particles is set forth below.

Method of Manufacture of Microporous Adsorbent Particles with Solid Impermeable Cores Methods of depositing microporous materials onto impermeable solid cores that may stem from sintering of appropriate materials comprise direct sol-gel synthesis processes, spray-coating, dip coating and tape casting of preferentially microporous materials with microparticulate size dimensions, preferentially such as <0.5 $\mu$m. Tape casting in particular is applicable to components with controlled porous shapes, channels, grids or various multi-layered structures.

Principles to form sintered polycrystalline bodies with extremely high density as referred to the theoretically possible value (>95%) which could be of use as solid impermeable cores for the second type of adsorbent materials of this invention, are described in numerous patent applications. For example, related processes to those specific types of particles are described in European Patent 0,308,873 A2, and German Patent DE 3,743,663 A1. In particular, sintering of mixtures of aluminum nitride and lanthanum and other rare earth metal oxides with appropriate additives at temperatures up to 1,900° C. at ambient pressure leads to stable non-porous polycrystalline cores to be used for manufacture of microporous sorbent macro particles with impermeable inner core. A further step would be "anchoring" of chemically reactive functional groups at the surface of those impermeable cores to enhance seeding of microporous solids.

Method of Manufacture of Hollow Particles

U.S. Pat. No. 5,316,993 describes molded bodies containing de-aluminated Y-type zeolite and a process for their production. The molded bodies represent solid extrudates and hollow cylinders and/or other tubular bodies. The hollow cylinders and/or tubular particles are manufactured by a process comprising mixing pulverulent de-aluminated Y-type zeolite with at least one binder, optionally with the addition of a lubricant and/or a pore former, and optionally with water and an organic solvent, and molding the resulting well-kneaded mass by means of suitable nozzles. The product is then activated as usual by known methods. Hollow cylinders with external and internal diameters up to 5 mm and 3 mm, respectively, have been reported. The process of manufacturing hollow cylindrical adsorbent particles disclosed in U.S. Pat. No. 5,316,993 can be adapted to manufacture the thermally stable hollow microporous zeo-type materials useful in the process of the present invention.

In addition, the process disclosed in European Patent EP 0,309,048 A1 may be utilized. This process comprises preparation of a shapeable dough which comprises mixing and kneading a particulate silica with water and ammonia (or an ammonia-releasing compound) to obtain a mixture of a certain wanted composition. Molded hollow zeo-type particles with very high thermal stability such as silicalite could also be obtained by a similar procedure, and modified then for purposes of adsorption or catalysis.

Another important procedure is press-shaping followed by sintering of the hollow solid (microporous) materials. This method is utilized for the manufacture of sorbent macro particles, and also of hollow ceramics particles that are useful for manufacture of filters, catalyst carriers, electrodes and electrolyte-retaining materials for fuel cells, e.g., Jpn. Kokai Tokkyo Koho JP 01,127,283 (89,172,2283). Press-shaping with subsequent burn-off of organic hole-shaping templates is described in DE 3,862,220.

Very important are sintering processes with regard to both hollow and impermeable solid core particles. Specific sintering processes for open, molded ceramic macro particles with various shapes have been disclosed in DE 0,236,498 and EP 0,236,498. In these processes, the control of ion exchange phenomena between the various crystalline phases that occur during sintering of certain mixtures of solid ingredients, is of outermost importance for ensuring product material stability.

The performance of oxygen VSA plants with a capacity of 55 metric tons of oxygen per day was simulated, and the fall plant capital and operational costs calculated, to quantify the benefits of the use of 4 mm diameter composite beads rather than 2 mm diameter conventional adsorbent beads, of the same active adsorbent composition, in the non cryogenic production of oxygen. The results obtained showed that use of the composite beads should result in a 14% increase in the $O_2$ product capacity of the plant and at the same time achieve a 13% reduction in the product oxygen cost.

It should be noted that the improvement in the performance of a PSA process using composite adsorbent beads described herein should be even higher than indicated in the illustrative example above. Normally, composite adsorbent beads with non-porous core would have higher heat capacity which would adsorb more heat during adsorption and thus increase the adsorption capacity. Simulation results indicated that an increase in heat capacity by 40% would lead to 10% increase in specific product for oxygen VSA process. In addition, commercially produced adsorbent beads tend to have higher density in the center. This means that the resistance to diffusion becomes greater as the molecules diffuse toward the center of the adsorbent beads. In other words, the effective diffusivity decreases from the outer surface to the center of the adsorbent bead. In the composite adsorbent beads, the diffusing species is excluded from the core; therefore, the improvement in mass transfer rate should be greater than what is shown in FIG. 1 and FIG. 2 in which constant effective diffusivity was assumed.

The main advantage of using composite adsorbent beads is that it can enhance the mass transfer inside the adsorbent beads without increasing the pressure drop through the adsorbent vessels that contain the adsorbent. It also increases the rate of heat dissipation through conduction inside the adsorbent beads and thus improves the performance of adsorption processes such as PSA and TSA if the inner layer is made of materials with higher heat conductivity/capacity. The improvements in both mass and heat transfer will result in better performance in the adsorption separation processes. Another advantage is that the use of a higher density material in the inner layer will allow higher gas feed flow rate without fluidizing the adsorbent vessel. Using higher feed flow in the adsorbent vessels will give more product per unit volume of adsorbent.

What we claim as our invention is:

1. A gas separation process comprising feeding a gaseous mixture comprising at least two components having different adsorption characteristics into an adsorption vessel containing at least one adsorbent material capable of preferentially adsorbing at least one of the gaseous components in the gaseous mixture and subjecting the gaseous mixture to conditions which enable the preferentially adsorbable gaseous component in the gaseous mixture to adsorb onto the adsorbent material and separate from the non-adsorbed component in the gaseous mixture which passes through the adsorbent vessel wherein at least one adsorbent material in the adsorption vessel comprises a composite particle having an inner core comprising a non-porous, non-adsorbent material and at least one outer layer comprising the adsorbent material.

2. The gas separation process of claim 1 wherein the separation is performed by pressure swing adsorption.

3. The gas separation process of claim 1 wherein the separation is performed by vacuum swing adsorption.

4. The gas separation process of claim 1 wherein the separation is performed by temperature swing adsorption.

5. The process of claim 1 wherein the outer layer of adsorbent material is selected from the group consisting of at least Activated Alumina, zeolites, mesopore-structured materials, carbon molecular sieve, and (c) mixtures of these.

6. The process of claim 5, wherein said zeolite is selected from the group consisting of BEA, CHA, EMT, ERI, FAU, FER, GIS, HEU, LTA, LTL, MAZ, MEI, MEL, MFI, MOR, MTW, OFF, TSC, ZSM-2, ZSM-18, ZSM-48 or mixtures thereof.

7. The process of claim 6, wherein said zeolite is of the structural type CHA, FAU, MOR, EMT.

8. The process of claim 7, wherein said zeolite is type Y zeolite having a Si/Al atomic ratio of at least about 5.

9. The process of claim 7, wherein said zeolite is of the MOR type and it has a Si/Al atomic ratio in the range of about 5 to about 10.

10. The process of claim 7, wherein said zeolite is of the CHA type and it has Si/Al atomic ratio in the range of about 2 to about 6.

11. The process of claim 6, wherein said zeolite is of the FAU type.

12. The process of claim 11, wherein said zeolite is type X zeolite having a Si/Al atomic ratio in the range of about 0.9 to about 1.25.

13. The process of claim 12, wherein said type X zeolite has a Si/Al atomic ratio in the range of about 0.9 to about 1.1.

14. The process of claim 5, wherein at least 50% of the exchangeable cations of said zeolite are ions of at least one of groups 1A, 1B, 2A, 2B, 3A, 3B, of the periodic table.

15. The process of claim 14, wherein said zeolite is type X zeolite at least 50% of whose exchangeable cations zeolite are lithium ions, calcium ions or mixtures thereof.

16. The process of claim 5, wherein about 50 to about 100% of the exchangeable cations of said zeolite are lithium ions; 0 to about 50% of said exchangeable cations are divalent cations selected from the group consisting of calcium, magnesium, barium, strontium and mixtures of these, trivalent ions selected from aluminum, scandium, gallium, iron (III), chromium (III), indium, yttrium, single lanthanides, mixtures of two or more lanthanides and mixtures of these, and mixtures of the above divalent and trivalent cations; and 0 to about 15% of said exchangeable cations are residual ions selected from sodium, potassium, ammonium, hydronium, zinc, copper II and mixtures of these.

17. The process of claim 5, wherein the exchangeable cations of said zeolite comprise about 70 to about 100% lithium ions and 0 to about 30% of divalent cations, trivalent cations or mixtures of divalent cations and trivalent cations.

18. The process of claim 17, wherein said trivalent ions are selected from the group consisting of aluminum, cerium, lanthanum, mixtures of two or more lanthanides in which the total lanthanum, cerium, praseodymium and neodymium ions present in the mixture comprises at least 50% of the total lanthanide ions, and mixtures of these.

19. The process of claim 18, wherein said zeolite is type X zeolite having a Si/Al atomic ratio in the range of about 0.9 to about 1.25.

20. The process of claim 19, wherein said type X zeolite has a Si/Al atomic ratio in the range of about 0.9 to about 1.1.

21. The process of claim 5 wherein the inner core is a non-porous material selected from the group consisting of metals, metal oxide, mixed oxides, dense ceramic oxides such as corderite, perovskite, etc., sintered clays such as kaolin, attapulgite, etc, silicas, aluminas, silica-alumina, silica-magnesia, silica-zirconia, silica-thoria, silica-beryllia, and silica-titania, as well as ternary compositions, such as silica-alumina-thoria, silica-alumina-zirconia, and mixtures of these.

22. The process of claim 5 wherein the inner core non-porous material is selected to have a higher heat conductivity than the adsorbent material.

23. The process of claim 5 wherein the inner core non-porous material has a density greater than the density of the adsorbent material.

24. The process of claim 1 wherein the composite particles are in the shape of beads having a radius between 0.5 mm to 5 mm.

25. The process of claim 1 wherein the separation process is performed by a combination of PSA, TSA and VSA.

26. A gas separation process comprising feeding a gaseous mixture comprising at least two components having different adsorption characteristics into an adsorption vessel containing at least one adsorbent material capable of preferentially adsorbing at least one of the gaseous components in the gaseous mixture and subjecting the gaseous mixture to non-cryogenic conditions which enable the preferentially adsorbable gaseous component in the gaseous mixture to adsorb onto the adsorbent material and separate from the non-adsorbed gaseous component in the gaseous mixture which passes through the adsorption vessel wherein the at least one adsorbent material comprises a hollow adsorbent particulate material.

27. The process of claim 26 wherein the adsorbent particulate material comprises hollow bead.

* * * * *